United States Patent
Shigihara (10) Patent No.: US 9,809,268 B2
(45) Date of Patent: Nov. 7, 2017

(54) STEP STRUCTURE OF MOTORCYCLE

(71) Applicant: HONDA MOTOR CO., LTD., Tokyo (JP)

(72) Inventor: Takashi Shigihara, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/222,055

(22) Filed: Jul. 28, 2016

(65) Prior Publication Data
US 2017/0036727 A1   Feb. 9, 2017

(30) Foreign Application Priority Data
Aug. 7, 2015   (JP) .................. 2015-157051

(51) Int. Cl.
| | | |
|---|---|---|
| *B62J 25/00* | (2006.01) | |
| *B60K 11/00* | (2006.01) | |
| *B62L 3/04* | (2006.01) | |
| *B62J 23/00* | (2006.01) | |
| *B60K 13/04* | (2006.01) | |
| *B62K 11/04* | (2006.01) | |
| *B62M 7/02* | (2006.01) | |

(52) U.S. Cl.
CPC .............. *B62J 25/00* (2013.01); *B60K 11/00* (2013.01); *B60K 13/04* (2013.01); *B62J 23/00* (2013.01); *B62K 11/04* (2013.01); *B62L 3/04* (2013.01); *B62M 7/02* (2013.01)

(58) Field of Classification Search
CPC .............. B62J 25/00; B60K 13/04; B62L 3/04
See application file for complete search history.

(56) References Cited

U.S. PATENT DOCUMENTS

| | | | | |
|---|---|---|---|---|
| 4,023,821 A | * | 5/1977 | Eiland ...................... | B62J 25/00 280/291 |
| 6,336,321 B1 | * | 1/2002 | Sagara ..................... | F01N 1/084 180/309 |
| 7,946,380 B2 | * | 5/2011 | Yamamoto .............. | F01N 13/14 181/204 |
| 8,602,158 B2 | * | 12/2013 | Hayama .................. | F01N 13/14 181/212 |
| 9,120,520 B2 | * | 9/2015 | Miyamoto ............... | B62J 17/00 |

(Continued)

FOREIGN PATENT DOCUMENTS

| | | |
|---|---|---|
| JP | 2002264868 A | 9/2002 |
| JP | 2011088522 A | 5/2011 |
| JP | 2013-226977 A | 11/2013 |

*Primary Examiner* — Kevin Hurley
(74) *Attorney, Agent, or Firm* — Birch, Stewart, Kolasch & Birch, LLP (57) ABSTRACT

A motorcycle with a reduced number of parts for a step structure to achieve a compact and simple structure. The motorcycle includes an engine main body of an engine, which exerts power for driving a rear wheel. The engine is mounted on a body frame with a main step on which a rider's foot is placed being supported on the body frame. An exhaust muffler, to which exhaust gas from the engine main body is introduced, is supported by a muffler stay attached to the body frame. A muffler stay, which is attached to attachment portions provided in a body frame above a main step, extends downwardly toward the rear from the attachment portions and functions as a heel guard for a rider placing his/her foot on the main step.

17 Claims, 6 Drawing Sheets

(56) References Cited

U.S. PATENT DOCUMENTS

| | | | |
|---|---|---|---|
| 9,573,459 B2* | 2/2017 | Shimomura | B60K 13/04 |
| 2016/0031512 A1* | 2/2016 | Yokoyama | B62J 25/00 |
| | | | 280/291 |
| 2016/0052581 A1* | 2/2016 | Seo | B62J 6/04 |
| | | | 224/413 |
| 2016/0052586 A1* | 2/2016 | Kunisada | F01N 13/1805 |
| | | | 280/830 |
| 2016/0090141 A1* | 3/2016 | Mizukura | B62J 35/00 |
| | | | 180/219 |
| 2016/0245138 A1* | 8/2016 | Kinoshita | F01N 1/24 |

* cited by examiner

STEP STRUCTURE OF MOTORCYCLE

CROSS-REFERENCE TO RELATED APPLICATIONS

The present application claims priority under 35 USC 119 to Japanese Patent Application No. 2015-157051 filed Aug. 7, 2015 the entire contents of which are hereby incorporated by reference.

1. Field of the Invention

The present invention relates to a motorcycle in which an engine main body of an engine, which exerts power for driving a rear wheel, is mounted on a body frame with a main step on which a rider's foot is placed being supported to the body frame. An exhaust muffler, to which exhaust gas from the engine main body is introduced, is supported by a muffler stay attached to the body frame. More particularly, the present invention relates to an improvement in a step structure.

2. Description of Background Art

Japanese Patent Application Publication No. 2013-226977 discloses a motorcycle wherein a pillion step bracket is provided for supporting a pillion step with a muffler supporting part for supporting an exhaust muffler being provided in a rear end part of a pillion step holder, which is attached to a body frame above a main step and extends upwardly toward the rear. A cover member, which is formed as a member separate from the pillion step holder to function as a heel guard for a rider placing his/her foot on the main step, is arranged above the main step in such a manner so as to cover a front part of the pillion step holder.

However, since the pillion step holder and the cover member are separate members in the structure disclosed in Japanese Patent Application Publication No. 2013-226977, the number of parts increases, and the structure around the main step becomes complex. Also, since the pillion step holder extends upwardly toward the rear from the body frame, the pillion step holder becomes enlarged.

SUMMARY AND OBJECTS OF THE INVENTION

The present invention has been made in view of the foregoing, and aims to provide a step structure of a motorcycle, which can be formed of less parts and be downsized, and can achieve a compact and simple structure.

According to an embodiment of the present invention, a motorcycle is provided having an engine main body of an engine, which exerts power for driving a rear wheel, wherein the engine is mounted on a body frame. A main step on which a rider's foot is placed is supported on the body frame with an exhaust muffler, to which exhaust gas from the engine main body is introduced, being supported by a muffler stay attached to the body frame. The muffler stay, which is attached to an attachment portion provided in the body frame above the main step, extends downwardly toward the rear from the attachment portion, and functions as a heel guard for the rider placing his/her foot on the main step.

According to an embodiment of the present invention, a foot positioning portion opened at least on an outer face of the muffler stay in the vehicle width direction is formed in the muffler stay, in such a manner so as to accommodate part of the rider's foot placed on the main step to determine a position of the foot on the main step.

According to an embodiment of the present invention, a main step stay is fixed to the body frame with a step movable-support member arranged on the inner side in the vehicle width direction of the muffler stay being supported to the main step stay, in such a manner so as to be movable in the longitudinal direction within a limited range. The main step is provided in the step movable-support member. A longitudinal length of the foot positioning portion is set larger than a longitudinally movable distance of the step movable-support member.

According to an embodiment of the present invention, a brake pedal for putting a brake on the rear wheel is arranged in front of the main step. A master cylinder unit, which outputs hydraulic pressure of a brake according to a pushing operation of the brake pedal, is supported to a master cylinder unit attachment portion provided in a rear part of the step movable-support member. The master cylinder unit attachment portion and the master cylinder unit are arranged in positions where they move in the longitudinal direction, on the inner side in the vehicle width direction of the muffler stay.

According to an embodiment of the present invention, a brake hose connected to the master cylinder unit is arranged on the inner side in the vehicle width direction of the muffler stay, in such a manner so as to partially overlap with the muffler stay in a side view.

According to an embodiment of the present invention, since the muffler stay functions as a heel guard, there is no need for an exclusive member for a heel guard, which makes the downsized step structure with the reduced number of parts. Also, the structure around the main step can be downsized and simplified.

According to an embodiment of the present invention, the foot positioning portion opened at least on the outer face of the muffler stay in the vehicle width direction is formed in the muffler stay, and determines the position of the rider's foot placed on the main step. This facilitates the rider's operation of the vehicle.

According to an embodiment of the present invention, the step movable-support member, on which the main step is provided and which is arranged on the inner side in the vehicle width direction of the muffler stay, is supported by the main step stay fixed to the body frame, such that the step movable-support member is movable in the longitudinal direction within a limited range. Thus, the position of the main step can be adjusted according to the rider's build. Moreover, the longitudinal length of the foot positioning portion formed in the muffler stay is set larger than the longitudinally movable distance of the step movable-support member. Thus, even when the position of the main step is moved in the longitudinal direction, the foot positioning portion can determine the position of the rider's foot placed on the main step to facilitate the rider's operation of the vehicle.

According to an embodiment of the present invention, the master cylinder unit, which outputs hydraulic pressure of a brake according to a pushing operation of the brake pedal, is supported to the master cylinder unit attachment portion provided in the rear part of the step movable-support member with the master cylinder unit attachment portion and the master cylinder unit moving with the step movable-support member, in the longitudinal direction on the inner side in the vehicle width direction of the muffler stay. Thus, a space on the inner side in the vehicle width direction of the muffler stay can be utilized effectively, and mass centralization and downsizing can be achieved.

According to an embodiment of the present invention, the brake hose is arranged on the inner side in the vehicle width direction of the muffler stay, while partially overlapping with the muffler stay in a side view. Thus, the brake hose can be made less recognizable to improve the appearance of the motorcycle, and the structure around the muffler stay can be downsized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
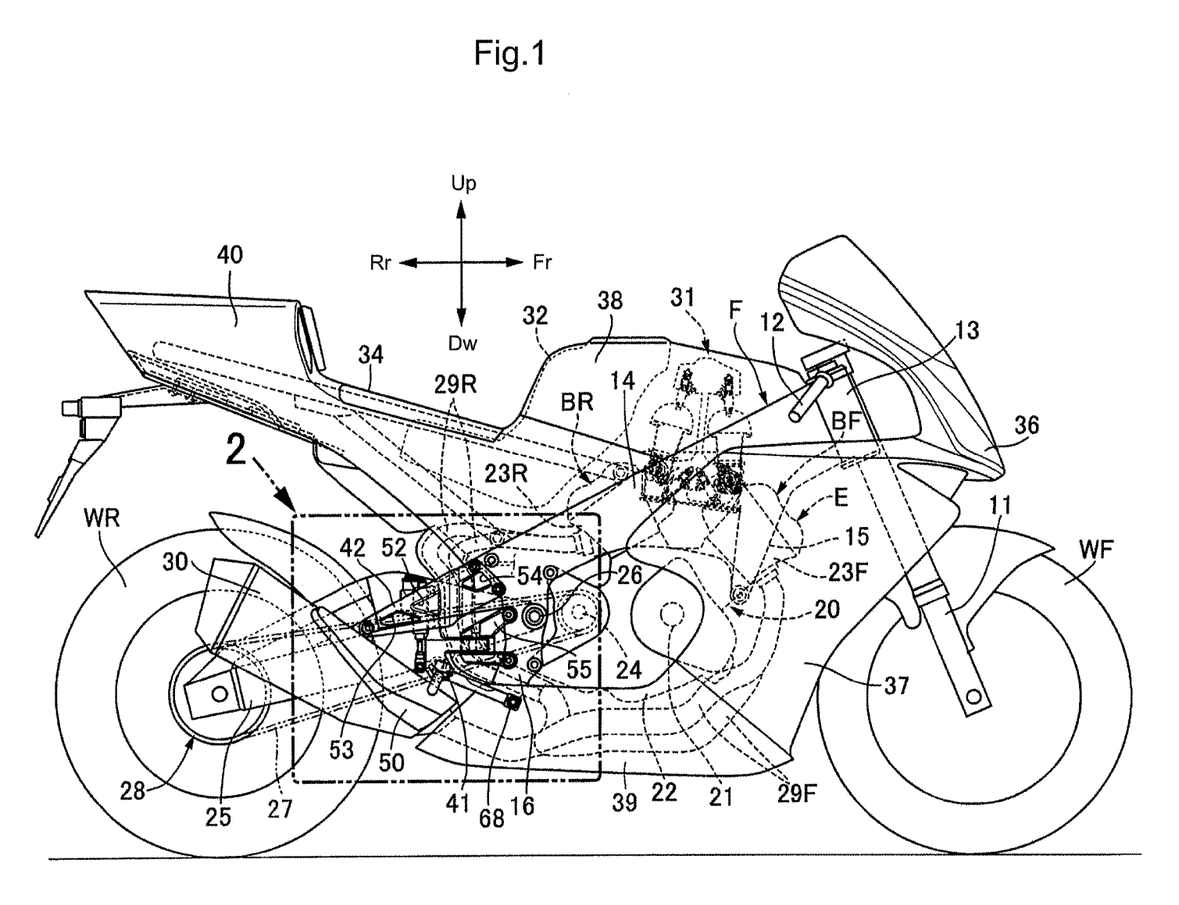
FIG. 1 is a right side view of a motorcycle.

An embodiment of the present invention will be described with reference to the accompanying FIGS. 1 to 6. As illustrated in FIG. 1, a body frame F of a motorcycle includes a head pipe 13, which steerably supports a front fork 11 pivotally supporting a front wheel WF on its lower end part, and a steering handle 12 connected to the front fork 11 with paired right and left main frames 14 extending downwardly toward the rear from the head pipe 13 and paired right and left down frames 15 extending downwardly toward the rear from front parts of the main frames 14, at a steeper angle than the tilt angle of the main frames 14. Paired right and left pivot frames 16 extend downwardly, while being integrally connected to the rear ends of the main frames 14. Paired right and left seat rails 17 include front end parts connected to longitudinal center parts of the main frames 14, and extend upwardly toward the rear. Paired right and left auxiliary frames 18 having front end parts connected to rear end parts of the main frames 14 extend upwardly toward the rear, and having rear end parts connected to longitudinal center parts of the seat rails 17.

An engine main body 20 of an engine E exerting power for driving a rear wheel WR is mounted on the body frame F. In the embodiment, the engine main body 20 configured as a V4 engine is supported to the body frame F while including a crankcase 22, which rotatably supports a crankshaft 21 having a center axis parallel to rotation axes of the front wheel WF and rear wheel WR and a front bank BF and rear bank BR, which are configured in a V shape opened upwardly and connected to a front upper part of the crankcase 22. Each of the front bank BF and rear bank BR is configured of two cylinders.

A gearshift mechanism (not shown) is accommodated in the crankcase 22, and an output shaft 24 of the gearshift mechanism protrudes to the side from a left side face of the crankcase 22. Also, a front end part of a swing arm 25, which pivotally supports the rear wheel WR on a rear end part thereof, is swingably supported to the pivot frame 16 of the body frame F through a spindle 26. Rotary power from the output shaft 24 is transmitted to the rear wheel WR, through a transmission mechanism 28 including an endless drive chain 27.

Paired front bank exhaust pipes 29F are connected to corresponding cylinders, on a front side wall of a cylinder head 23F of the front bank BF with paired rear bank exhaust pipes 29R being connected to corresponding cylinders, on a rear side wall of a cylinder head 23R of the rear bank BR. The front bank exhaust pipes 29F extend rearwardly while passing front to lower parts of the crankcase 22, and the rear bank exhaust pipes 29R extend downwardly along upper to rear parts of the crankcase 22, are arranged to turn to the lower side of the crankcase 22, so that the front bank exhaust pipes 29F and the rear bank exhaust pipes 29R are joined below a rear part of the crankcase 22, and are connected to an exhaust muffler 30 arranged on the right side of the rear wheel WR.

An intake system 31, which is connected to the cylinder heads 23F, 23R of the front bank BF and the rear bank BR, is arranged between the banks BF, BR, and a fuel tank 32 supported by the main frames 14 is arranged behind the intake system 31 and above the engine main body 20. Also, a riding seat 34, which is arranged in the rear obliquely upper direction of the engine E, is supported to the seat rails 17 of the body frame F. The fuel tank 32 is formed such that its rear part extends toward a lower part of the riding seat 34.

A front cowl 36 covers parts of the steering handle 12 and head pipe 13 from the front with paired right and left front side cowls 37 covering a front part of the engine E from both sides in the vehicle width direction. A top cowl 38 covers a top part of the engine E and a top part of the fuel tank 32, from above and both sides in the vehicle width direction with a lower side cowl 39, which is continuous with the front side cowls 37, for covering a lower part of the engine E from both sides in the vehicle width direction. A rear cowl 40, which is continuous with the top cowl 38, covers a rear part of the body frame F with the front cowl 36, the front side cowls 37, the top cowl 38, the lower side cowl 39, and the rear cowl 40 being supported to the body frame F.

Figure 2:
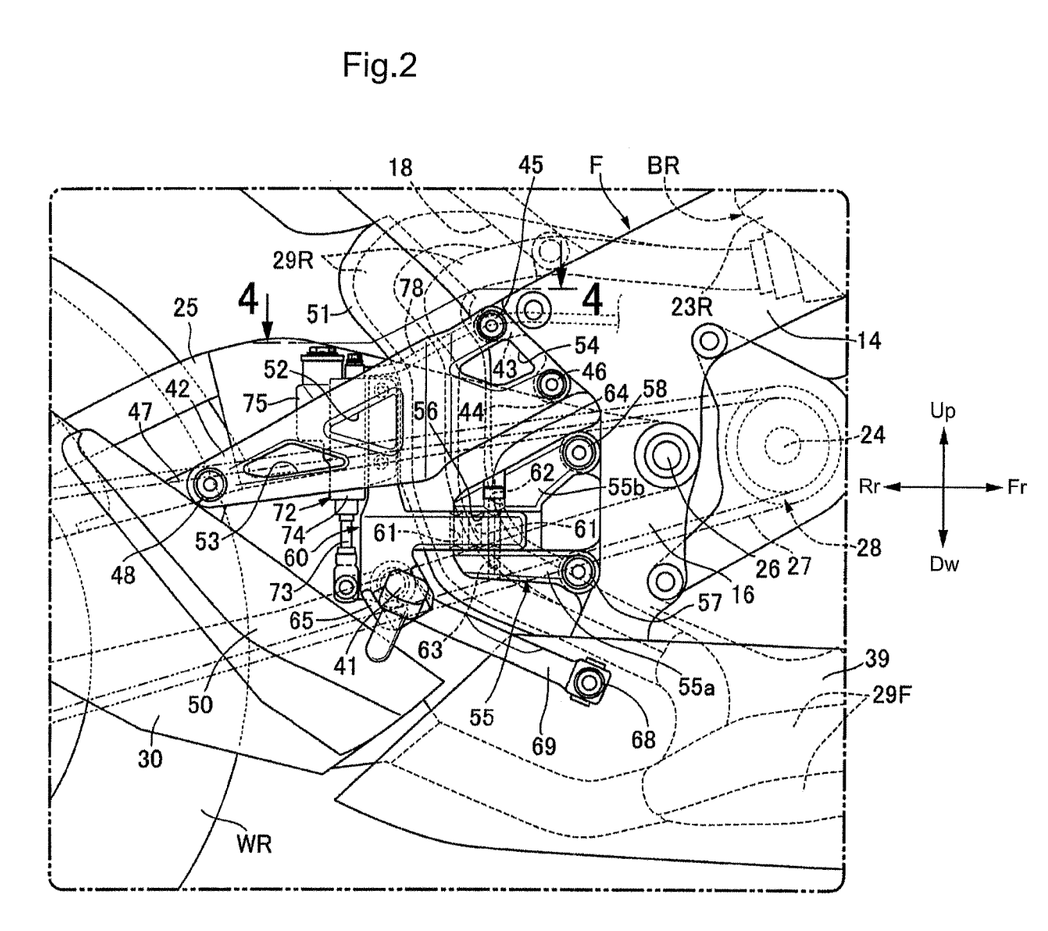
FIG. 2 is an enlarged view of a part indicated by arrow 2 of FIG. 1.
Figure 3:
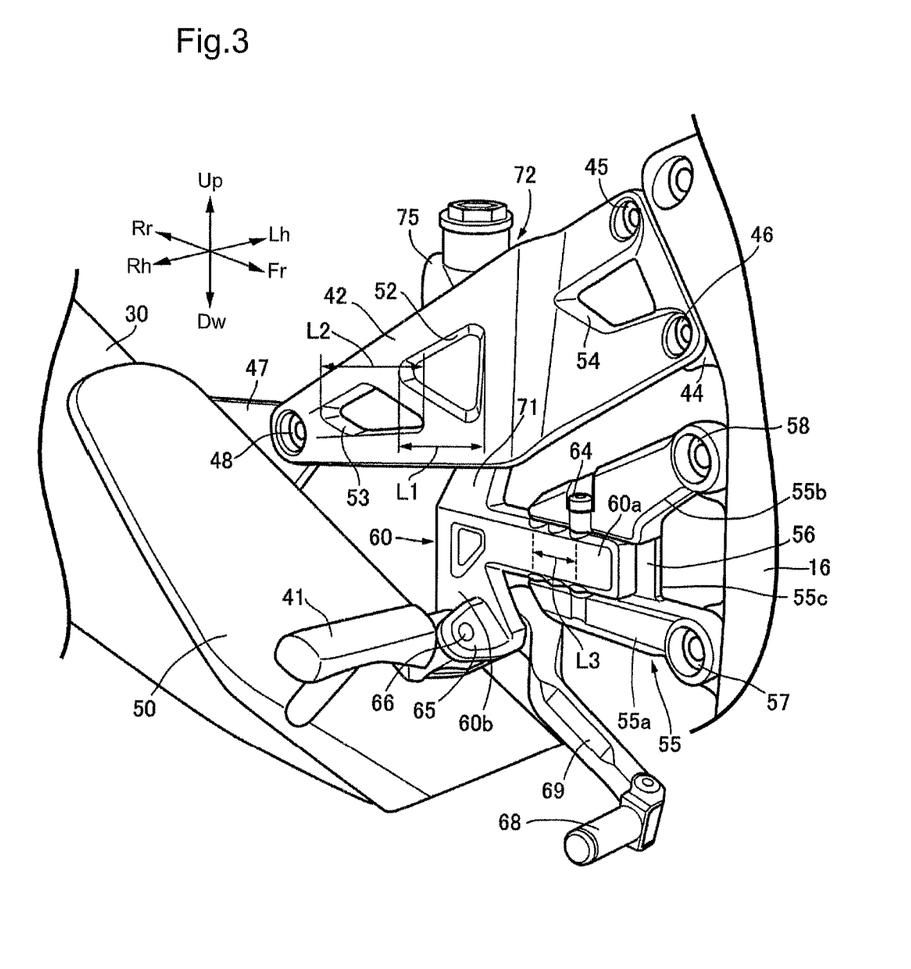
FIG. 3 is a perspective view of a main part of FIG. 2.
Figure 4:
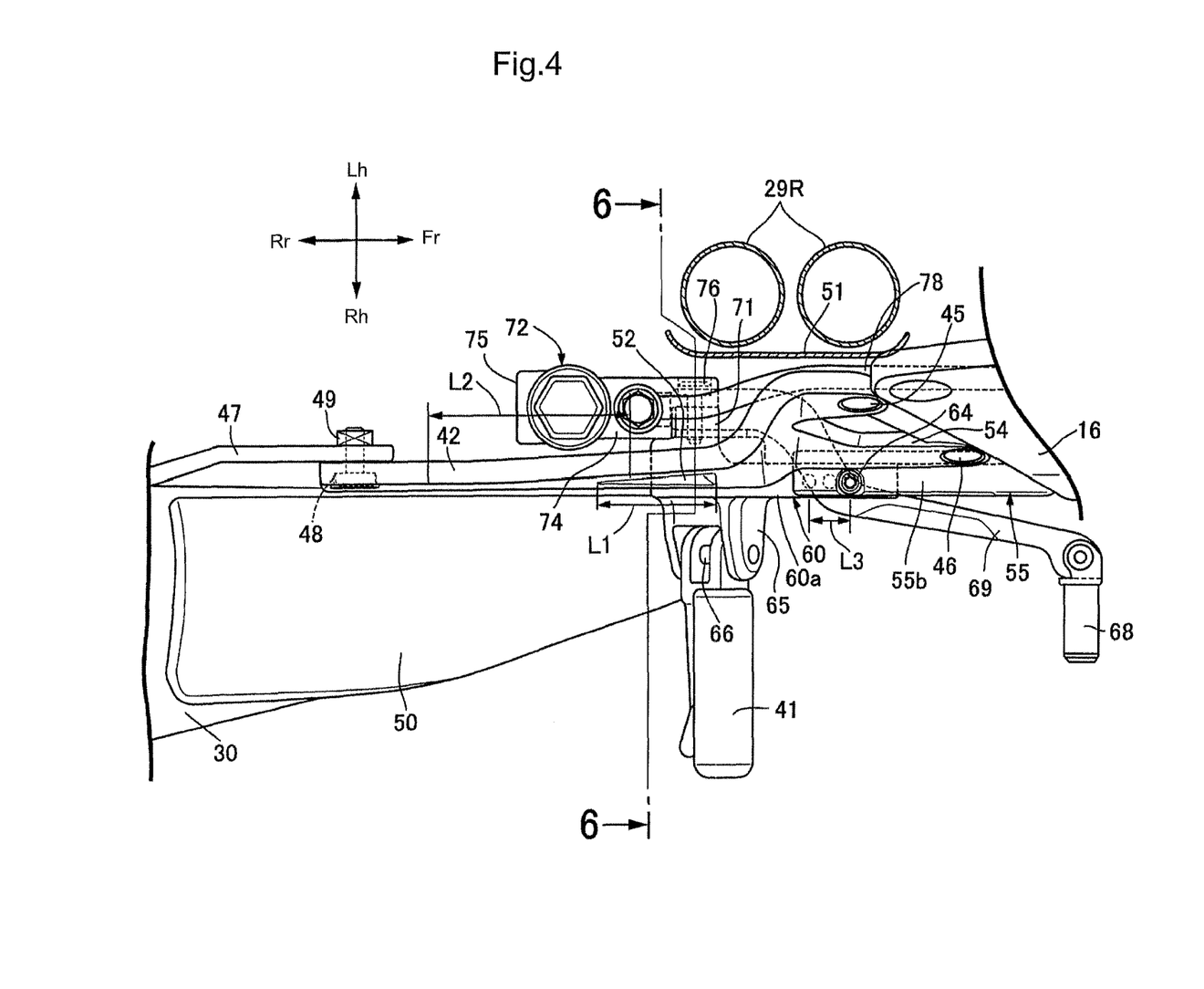
FIG. 4 is a cross-sectional view taken along line 4-4 of FIG. 2.

Referring to FIGS. 2 to 4, a bar-shaped main step 41, on which the foot of a rider sitting on the riding seat 34 is placed, is supported to the pivot frame 16 of the body frame F, and the exhaust muffler 30 is supported by a muffler stay 42, which is attached to the pivot frame 16.

Moreover, paired attachment portions 43, 44 spaced apart in the vertical direction are provided in the pivot frame 16, in positions higher than the main step 41. Front end parts of the muffler stay 42 are attached to the attachment portions 43, 44 with bolts 45, 46, respectively. The muffler stay 42 attached to the attachment portions 43, 44 extends downwardly toward the rear, from the attachment portions 43, 44. An attached plate 47, which is provided in an upper part of the exhaust muffler 30 close to the front end thereof, is fastened to a rear end part of the muffler stay 42, with a bolt 48 and a weld nut 49 fixed to the attached plate 47. Also, a front part of the exhaust muffler 30 is covered from above with a heat insulating muffler cover 50 with the muffler cover 50 being supported by the exhaust muffler 30.

The paired rear bank exhaust pipes 29R are arranged on the inner side in the vehicle width direction of the muffler stay 42, in such a manner so as to partially overlap with the muffler stay 42 in a side view. A heat insulating exhaust pipe cover 51, which covers the rear bank exhaust pipes 29R from the outer side in the vehicle width direction, is fixedly arranged on the inner side in the vehicle width direction of the muffler stay 42.

Also, the muffler stay 42 is arranged on the inner side in the vehicle width direction of and above the main step 41, and tilts downwardly toward the rear. Thus, the muffler stay also functions as a heel guard for the rider placing his/her foot on the main step 41. Here, "function as a heel guard" means that the heel or ankle of the rider is brought into contact with the part, so that the rider can sandwich the vehicle with the legs to more easily fix his/her position.

Figure 5:
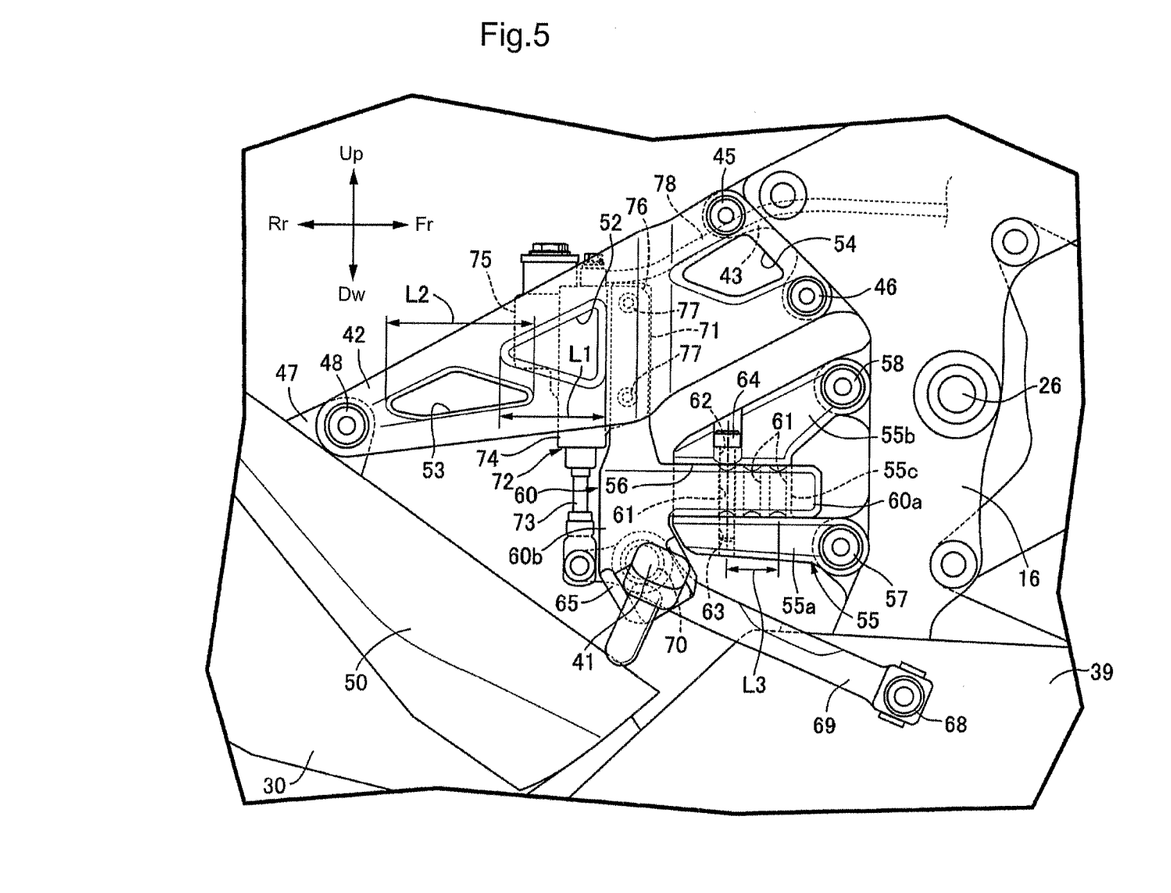
FIG. 5 is a side view corresponding to a part of FIG. 2, where a step movable-support member is moved to the forefront.

Also referring to FIG. 5, a main step stay 55 arranged below the muffler stay 42, is fixed to the pivot frame 16 of the body frame F. The main step stay 55 includes, as one body, a lower attachment arm portion 55a extending in the longitudinal direction of the vehicle with an upper attachment arm portion 55b arranged above the lower attachment arm portion 55a, and tilted upwardly toward the front such that a gap between itself and the lower attachment arm portion 55a increases toward the vehicle front. A connection portion 55c connects rear parts of the lower attachment arm portion 55 and the upper attachment arm portion 55b, and forms a guide groove 56, which opens toward the outer side in the vehicle width direction and extends in the longitudinal direction of the vehicle, between the rear parts of the lower attachment arm portion 55a and the upper attachment arm portion 55b. Front end parts of the lower attachment arm portion 55a and the upper attachment arm portion 55b are attached to a lower part of the pivot frame 16, with bolts 57, 58.

Also, a step-movable support member 60 arranged on the inner side in the vehicle width direction of the muffler stay 42 is supported to the main step stay 55, in such a manner so as to be movable in the longitudinal direction within a limited range. The step movable-support member 60 is formed to include, as one body, a guide arm portion 60a extending in the longitudinal direction of the vehicle, and slidably fitted into the groove 56 of the main step stay 55, and a step support portion 60b extending downwardly from a rear end part of the guide arm portion 60a.

Multiple (three in the embodiment) insertion holes 61 are formed in the guide arm portion 60a of the step movable-support member 60, such that they are spaced apart in the longitudinal direction of the vehicle, and have axes extending along the vertical direction. Meanwhile, an insertion hole 62 for inserting a bolt 64, which is selectively inserted into one of the multiple insertion holes 61 in the guide arm portion 60a, is provided in the upper attachment arm portion 55b of the main step stay 55, and a screw hole 63 for screwing in the bolt 64, which is inserted into the insertion hole 62 and selectively inserted into one of the multiple insertion holes 61, is provided in the lower attachment arm portion 55a of the main step stay 55.

Accordingly, the step-movable support member 60 is supported to the main step stay 55, in such a manner so as to be movable in the longitudinal direction by selecting one of the multiple insertion holes 61 in the guide arm portion 60a, and moving to a position corresponding to the insertion hole 62 and the screw hole 63. As clearly shown in FIG. 5, a state, where the bolt 64 is inserted into the rear end insertion hole 61 of the multiple insertion holes 61 aligned in the longitudinal direction, is the movable end of the step movable-support member 60 toward the front, and as clearly shown in FIGS. 2 and 3, a state, where the bolt 64 is inserted into the front end insertion hole 61 of the multiple insertion holes 61, is the movable end of the step movable-support member 60 toward the rear.

Figure 6:
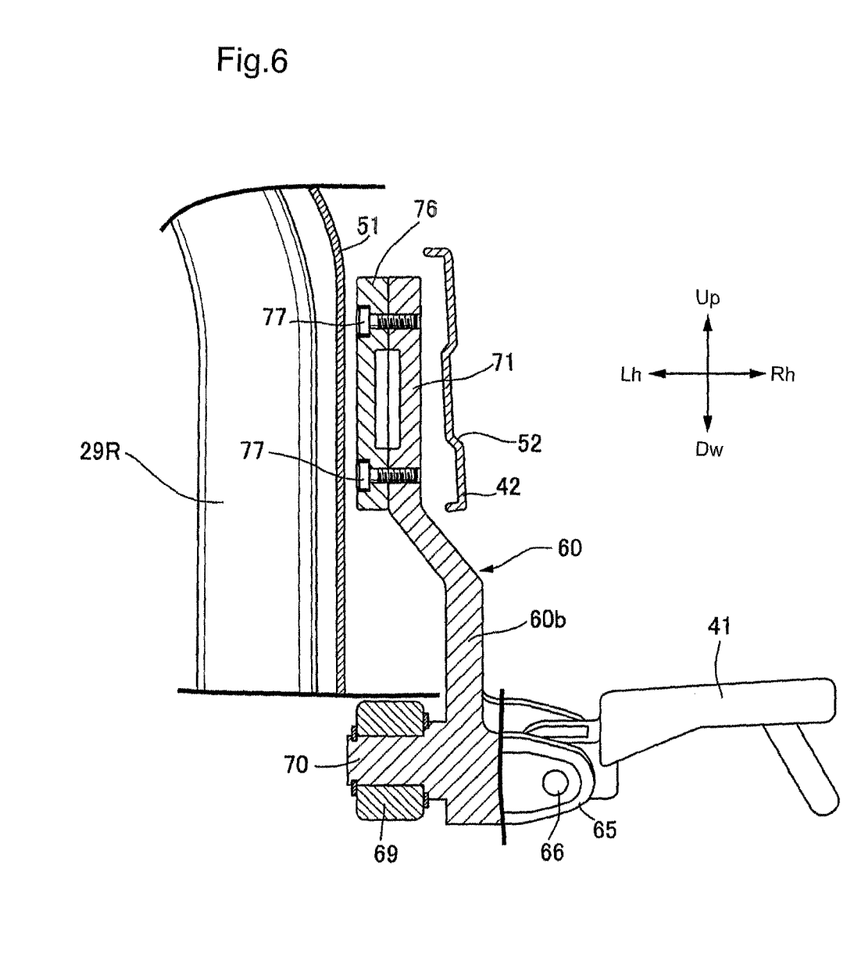
FIG. 6 is a cross-sectional view taken along line 6-6 of FIG. 4.

Also referring to FIG. 6, foot positioning portions 52, 53, which accommodate part of the rider's foot placed on the main step 41 to determine the position of the foot on the main step 41, are formed in the muffler stay 42, such that they open at least on the outer face of the muffler stay 42 in the vehicle width direction.

In the embodiment, the foot positioning portion 52 is formed as a concave part opened on the outer face of the muffler stay 42 in the vehicle width direction. The foot positioning portion 53 is formed in the muffler stay 42 behind the foot positioning portion 52, as a through hole having both ends opened on inner and outer faces of the muffler stay 42 in the vehicle width direction, to function also as a lightening hole for reducing weight. The muffler stay 42 also has a lightening hole 54, which is arranged in front of the foot positioning portion 52, in such a manner so as to sandwich the foot positioning portion 52 between itself and the foot positioning portion 53.

Moreover, a longitudinal length L1 of the foot positioning portion 52 and a longitudinal length L2 of the foot positioning portion 53 in the muffler stay 42, are set larger than a longitudinally movable distance L3 of the step movable-support member 60 mentioned above.

A bracket 65 is provided integrally with a lower outer face of the step support portion 60b of the step movable-support member 60, and the main step 41 is rotatably supported to the bracket 65 through a support pin 66.

A brake pedal 68 for putting a brake on the rear wheel WR is arranged in front of the main step 41. The brake pedal 68 is provided on a front end part of a lever 69, which is rotatably supported by a shaft 70 integrally embedded in the inner face of a lower part of the step support portion 60b.

Also, a master cylinder unit attachment portion 71, which is integrally connected with the upper end of the step support portion 60b and extends upwardly, is provided in a rear part of the step movable-support member 60. A master cylinder unit 72, which outputs hydraulic pressure of the brake according to a pushing operation of the brake pedal 68, is supported to the master cylinder unit attachment portion 71.

The master cylinder unit 72 is configured of a master cylinder 74, which has a piston rod 73 connected to and working in response to the movement of a rear end part of the lever 69, and a reservoir 75 provided integrally with the master cylinder 74. An attachment plate 76 connected integrally with the master cylinder 74 is attached to the master cylinder unit attachment portion 71, with paired upper and lower bolts 77.

Moreover, the master cylinder unit attachment portion 71 and the master cylinder unit 72 are arranged on the inner side in the vehicle width direction of the muffler stay 42, and on the outer side in the vehicle width direction of the heat insulating exhaust pipe cover 51, which covers the rear bank exhaust pipes 29R from the outer side in the vehicle width direction. Thus, the master cylinder unit attachment portion 71 and the master cylinder unit 72, which move together with the step movable-support member 60, move in the longitudinal direction on the inner side in the vehicle width direction of the muffler stay 42.

A brake hose 78, which introduces hydraulic pressure of the brake for putting a brake on the rear wheel WR, is connected to the master cylinder 74 of the master cylinder unit 72. As shown in FIG. 2, the brake hose 78 is arranged on the inner side in the vehicle width direction of the muffler stay 42, in such a manner so as to partially overlap with the muffler stay 42 in a side view.

Next, the effects of the embodiment will be described. The muffler stay 42 supporting the exhaust muffler 30 is attached to the attachment portions 43, 44, which are provided in the body frame F above the main step 41 and the muffler stay 42 extends downwardly toward the rear from the attachment portions 43, 44, and functions as a heel guard for the rider placing his/her foot on the main step 41. Thus, there is no need for an exclusive member for a heel guard, and the number of parts can be reduced. Also, the structure around the main step 41 can be downsized and simplified.

Moreover, by reducing the number of parts, the muffler stay 42 can be configured to not project outward needlessly in the vehicle width direction. Thus, the rider can mount and dismount the vehicle more easily.

Also, the foot positioning portions 52, 53, which accommodate part of the rider's foot placed on the main step 41 to determine the position of the foot on the main step 41, are formed on the outer face of the muffler stay 42. Thus, the foot positioning portions 52, 53 determine the position of the rider's foot placed on the main step 41, and facilitate the rider's operation of the vehicle.

Also, the main step stay 55 is fixed to the body frame F with the step movable-support member 60 arranged on the inner side in the vehicle width direction of the muffler stay 42 being supported to the main step stay 55, in such a manner as to be movable in the longitudinal direction within a limited range; and the main step 41 is provided in the step movable-support member 60. Thus, the position of the main step 41 can be adjusted according to the rider's build. Moreover, the longitudinal lengths L1, L2 of the foot positioning portions 52, 53 formed in the muffler stay 42 are set larger than the longitudinally movable distance L3 of the step movable-support member 60. Thus, even when the position of the main step 41 is moved in the longitudinal direction, the foot positioning portions 52, 53 can determine the position of the rider's foot placed on the main step 41, and facilitate the rider's operation of the vehicle.

Also, the brake pedal 68 for putting a brake on the rear wheel WR is arranged in front of the main step 41. The master cylinder unit 72, which outputs hydraulic pressure of the brake according to a pushing operation of the brake pedal 68, is supported to the master cylinder unit attachment portion 71 provided in the rear part of the step movable-support member 60. The master cylinder unit attachment portion 71 and the master cylinder unit 72 are arranged in positions where they move in the longitudinal direction, on the inner side in the vehicle width direction of the muffler stay 42. Thus, space on the inner side in the vehicle width direction of the muffler stay 42 can be utilized effectively, and mass centralization and downsizing can be achieved.

Also, since the muffler stay 42 covers the master cylinder unit 72 from the outer side in the vehicle width direction, the master cylinder unit 72 can be arranged in a less recognizable position to improve appearance.

Furthermore, the brake hose 78 connected to the master cylinder unit 72 is arranged on the inner side in the vehicle width direction of the muffler stay 42, in such a manner so as to partially overlap with the muffler stay 42 in a side view. Thus, the brake hose 78 can be made less recognizable to improve appearance of the motorcycle, and the structure around the muffler stay 42 can be downsized.

Although the embodiment of the present invention has been described, the invention is not limited to the above embodiment, and various design changes can be made without departing from the invention described in the scope of claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A step structure of a motorcycle wherein an engine main body of an engine, which exerts power for driving a rear wheel, is mounted on a body frame with a main step on which a rider's foot is placed is supported to said body frame and an exhaust muffler, to which exhaust gas from said engine main body is introduced, is supported by a muffler stay attached to said body frame, comprising:
    said muffler stay, which is attached to an attachment portion provided on said body frame above said main step, extends downwardly toward the rear from said attachment portion, and functions as a heel guard for the rider placing his/her foot on said main step; and
    a heat insulating muffler cover disposed adjacent to the main step, said heat insulating muffler cover being supported by the exhaust muffler.

2. The step structure of a motorcycle according to claim 1, wherein a foot positioning portion opened at least on an outer face of said muffler stay in the vehicle width direction is formed in said muffler stay, in such a manner so as to accommodate part of the rider's foot placed on said main step to determine a position of said foot on said main step.

3. The step structure of a motorcycle according to claim 2, wherein:
    a main step stay is fixed to said body frame;
    a step movable-support member arranged on the inner side in the vehicle width direction of said muffler stay is supported to said main step stay, in such a manner so as to be movable in the longitudinal direction within a limited range;
    said main step is provided in said step movable-support member; and
    a longitudinal length of said foot positioning portion is set larger than a longitudinally movable distance of said step movable-support member.

4. The step structure of a motorcycle according to claim 3, wherein :
    a brake pedal for putting a brake on said rear wheel is arranged in front of said main step;
    a master cylinder unit, which outputs hydraulic pressure of a brake according to a pushing operation of said brake pedal, is supported to a master cylinder unit attachment portion provided in a rear part of said step movable-support member; and
    said master cylinder unit attachment portion and said master cylinder unit are arranged in positions where they move in the longitudinal direction, on the inner side in the vehicle width direction of said muffler stay.

5. The step structure of a motorcycle according to claim 4, wherein a brake hose connected to said master cylinder unit is arranged on the inner side in the vehicle width direction of said muffler stay, in such a manner as to partially overlap with said muffler stay in a side view.

6. The step structure of a motorcycle according to claim 3, and further including a plurality of insertion holes formed in a guide arm portion of the step movable-support member and an insertion bolt for selectively engaging one of the plurality of insertion holes for selectively fixing the guide arm portion relative to the body frame.

7. A step structure of a motorcycle comprising:
a body frame;
an engine operatively mounted on the body frame;
a main step on which a rider's foot is placed is supported on said body frame;
an exhaust muffler operatively connected to the engine for receiving exhaust gas from said engine;
a muffler stay attached to said body frame for supporting said exhaust muffler;
an attachment portion provided on said body frame above said main step for attaching said muffler stay, said muffler stay extends downwardly toward the rear from said attachment portion, and functions as a heel guard for the rider placing, his/her foot on said main step; and
a heat insulating muffler cover disposed adjacent to the main step, said heat insulating muffler cover being supported by the exhaust muffler.

8. The step structure of a motorcycle according to claim 7, wherein a foot positioning portion opened at least on an outer face of said muffler stay in the vehicle width direction is formed in said muffler stay, in such a manner so as to accommodate part of the rider's foot placed on said main step to determine a position of said foot on said main step.

9. The step structure of a motorcycle according to claim 8, wherein:
a main step stay is fixed to said body frame;
a step movable-support member arranged on the inner side in the vehicle width direction of said muffler stay is supported to said main step stay, in such a manner so as to be movable in the longitudinal direction within a limited range;
said main step is provided in said step movable-support member; and
a longitudinal length of said foot positioning portion is set larger than a longitudinally movable distance of said step movable-support member.

10. The step structure of a motorcycle according to claim 9, wherein:
a brake pedal for putting a brake on said rear wheel is arranged in front of said main step;
a master cylinder unit, which outputs hydraulic pressure of a brake according to a pushing operation of said brake pedal, is supported to a master cylinder unit attachment portion provided in a rear part of said step movable-support member; and
said master cylinder unit attachment portion and said master cylinder unit are arranged in positions where they move in the longitudinal direction, on the inner side in the vehicle width direction of said muffler stay.

11. The step structure of a motorcycle according to claim 10, wherein a brake hose connected to said master cylinder unit is arranged on the inner side in the vehicle width direction of said muffler stay, in such a manner as to partially overlap with said muffler stay in a side view.

12. The step structure of a motorcycle according to claim 9, and further including a plurality of insertion holes formed in a guide arm portion of the step movable-support member and an insertion bolt for selectively engaging one of the plurality of insertion holes for selectively fixing the guide arm portion relative to the body frame.

13. A step structure of a motorcycle comprising:
a body frame;
a main step on which a rider's foot is placed, said main step being supported on said body frame;
an exhaust muffler operatively connected to the body frame;
a muffler stay attached to said body frame for supporting said exhaust muffler;
an attachment portion provided on said body frame above said main step for attaching said muffler stay, said muffler stay extends downwardly toward the rear from said attachment portion, and functions as a heel guard for the rider placing his/her foot on said main step; and
a heat insulating muffler cover disposed adjacent to the main step, said heat insulating muffler cover being supported by the exhaust muffler.

14. The step structure of a motorcycle according to claim 13, wherein a foot positioning portion opened at least on an outer face of said muffler stay in the vehicle width direction is formed in said muffler stay, in such a manner so as to accommodate part of the rider's foot placed on said main step to determine a position of said foot on said main step.

15. The step structure of a motorcycle according to claim 14 wherein:
a main step stay is fixed to said body frame;
a step movable-support member arranged on the inner side in the vehicle width direction of said muffler stay is supported to said main step stay, in such a manner so as to be movable in the longitudinal direction within a limited range;
said main step is provided in said step movable-support member; and
a longitudinal length of said foot positioning portion is set larger than a longitudinally movable distance of said step movable-support member.

16. The step structure of a motorcycle according to claim 15, wherein:
a brake pedal for putting a brake on said rear wheel is arranged in front of said main step;
a master cylinder unit, which outputs hydraulic pressure of a brake according to a pushing operation of said brake pedal, is supported to a master cylinder unit attachment portion provided in a rear part of said step movable-support member; and
said master cylinder unit attachment portion and said master cylinder unit are arranged in positions where they move in the longitudinal direction, on the inner side in the vehicle width direction of said muffler stay.

17. The step structure of a motorcycle according to claim 16, wherein a brake hose connected to said master cylinder unit is arranged on the inner side in the vehicle width direction of said muffler stay, in such a manner as to partially overlap with said muffler stay in a side view.

* * * * *